P. L. GANYO.
SAW GAGE.
APPLICATION FILED MAY 27, 1911.
1,033,392.
Patented July 23, 1912.
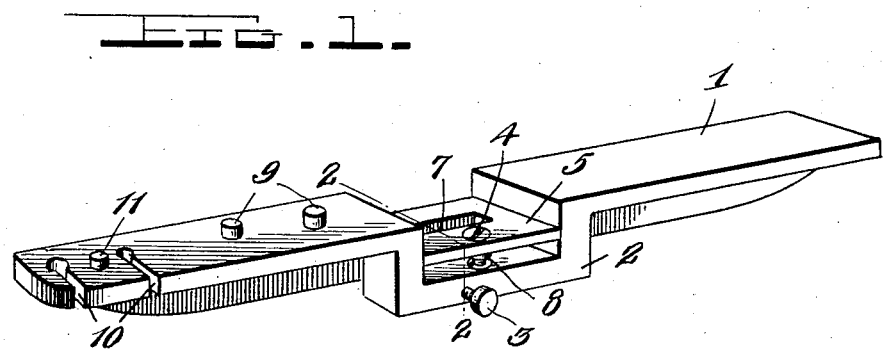
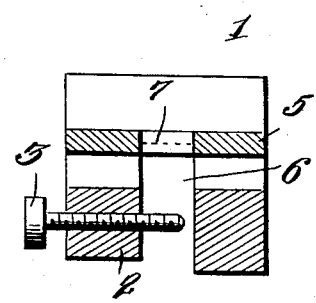
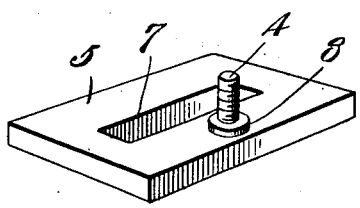
Witnesses
Chas. L. Griestauer.
L. G. Ellis
Inventor
P. L. Ganyo,
By Watson E. Coleman.
Attorney

UNITED STATES PATENT OFFICE.

PATRICK L. GANYO, OF WILLIAMS, MINNESOTA, ASSIGNOR OF ONE-HALF TO ERNEST C. WETHERBY, OF WARROAD, MINNESOTA.

SAW-GAGE.

1,033,392.   Specification of Letters Patent.   Patented July 23, 1912.

Application filed May 27, 1911.  Serial No. 629,767.

*To all whom it may concern:*

Be it known that I, PATRICK L. GANYO, a citizen of the United States, residing at Williams, in the county of Beltrami and State of Minnesota, have invented certain new and useful Improvements in Saw-Gages, of which the following is a specification, reference being had to the accompanying drawings.

This invention relates to saws and more particularly to saw-gages that are used in sharpening and setting the teeth of saws.

The objects of my invention are to provide a saw-gage which will have means for regulating the depth of the teeth to be cut.

Other objects of my invention will become apparent as it is more fully set forth.

It is well known that the sharpening of saws requires a great deal of skill on the part of the one who does this work, and also that unless the work is done very carefully, the saw will have its teeth broken and be left in much worse condition than before the sharpening was begun. Ordinarily when the sharpening or teeth setting is done, the depths that are quite usual, vary greatly on account of the primitive means used for doing this work. In my device these objections are eliminated and an ordinary mechanic can be quickly trained to use it.

In the accompanying drawings which illustrate by way of example an embodiment of my invention Figure 1 represents a perspective view of a saw gage embodying my invention; Fig. 2 is a transverse section along the line 2—2 of Fig. 1; and Fig. 3 is a detail of the adjusting means for regulating the depth of the teeth to be gaged.

Similar reference characters refer to similar parts throughout the drawings.

Referring to the drawings 1 is the body proper of a saw gage which is preferably of a somewhat angular shape and has in its middle and upper portions a recessed part 2, which is drilled and threaded to receive a set-screw 3 and also to receive a fastening screw 4, adapted to secure a grooved plate 5 into this recessed portion. The recessed portion 2 is provided with a slot 6 which is arranged to permit the teeth of the saw to project therethrough. A slot 7 is provided in the plate 5 to correspond with the slot 6. The sizes of the slot of the plate are made to correspond suitably, to the size of the file that is usual to use in this class of work.

The fastening screw 4 is provided on its underside with a washer 8 sweated on to it, which keeps the same in the same relative position to the plate, so that in the turning of this screw, the plate will be adjusted up and down to vary the depth, to which the teeth will be notched. When the blade of the saw has been placed in position the set-screw 3 is tightened in and clamps it firmly in position.

In operation the body 1 is placed in position and the plate 5 is adjusted to suit the depth it is desired to file the teeth. The set-screw 3 is then clamped after the saw is put into the set and has its teeth projecting up through the slots 6 and 7, as the operator actuates his file suitably across these teeth and gives them the desired rake.

It will be noticed by referring to the drawings that there are a number of bosses or stubs 9 on the outer flat surface of the saw gage, and also that there are a pair of grooves 10 disposed within the end of the device, and also that there is an adjustable screw 11 disposed between the two grooves 10. These various parts are for the purpose of setting the rake of the teeth and are used in the following manner: A tooth of a saw is placed within one of the grooves 10, the grooves vary in size to suit the various thicknesses of saws, and a leverage is put on the other end of the saw gage which bends the tooth over. Then the saw is removed from the groove and its blade is laid flat on the two stubs 9, and the blade is moved down until its tooth point comes in contact with the upper edge of the adjusted screw 11. By this means it can be seen whether the tooth is bent too much or not, and suitable action is put on the tooth to remedy any defect in its set, should the same be necessary. This screw can be adjusted to suit any set that is desired or any particular type of saw, which makes it a particularly desirable feature in a saw gage, because it gives all of the teeth a uniform set.

The advantages of this device are that it is light, compact and comparatively strong. It is comparatively cheap to manufacture and all its parts actuate positively to give the desired results.

Obviously while I have shown but one modification of my invention I do not wish to limit the construction to that one modification, otherwise than necessitated by the prior art, as many modifications of my invention can be made without departing from the principles thereof.

Having thus described the invention what is claimed is:

A saw gage comprising in combination, a body piece having its central portion recessed, said recessed portion having its sides disposed at right angles to the bottom portion thereof and having a slot disposed longitudinally therein, adjacent to the back side of said body piece, said recessed portion being provided with a threaded hole adjacent to the front portion thereof, said recessed portion being arranged so as to provide a space between its back portion and the back side of said body piece, so that a saw blade may be inserted therein, a rectangular plate arranged to fit closely in said recessed portion and having a slot provided therein so as to be in registry with the slot in said recessed portion, having a hole provided therein adjacent to the front edge thereof and arranged to come into registry with said threaded hole, the upper portion of said hole being countersunk, a screw disposed in said holes and arranged so that its head portion would be disposed in said countersunk portion, said screw having a washer fastened thereon so as to keep said screw in the same relative position in said plate, the threaded portion of said screw being disposed in the hole of said recessed portion, so that the turning of the same will raise and lower said plate, a clamping screw disposed in the bottom portion of said recessed portion, extending transversely therethrough so as to come adjacent to the back side of said body piece, and arranged to clamp a saw blade to said gage so that its teeth will extend through said grooves in the recessed portion and the plate, substantially as described.

In testimony whereof I hereunto affix my signature in the presence of two witnesses.

PATRICK L. GANYO.

Witnesses:
ALBERT CHILGREN,
GEORGE F. ROWLEY.